US012715341B2

(12) United States Patent
Cheng

(10) Patent No.: US 12,715,341 B2
(45) Date of Patent: Aug. 25, 2026

(54) CHILD SAFETY SEAT AND ELECTRIC ANGLE ADJUSTMENT DEVICE THEREOF

(71) Applicant: Wonderland Switzerland AG, Steinhausen (CH)

(72) Inventor: Manqun Cheng, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 109 days.

(21) Appl. No.: 18/691,830

(22) PCT Filed: Sep. 26, 2022

(86) PCT No.: PCT/EP2022/076675
§ 371 (c)(1),
(2) Date: Mar. 13, 2024

(87) PCT Pub. No.: WO2023/046954
PCT Pub. Date: Mar. 30, 2023

(65) Prior Publication Data

US 2024/0343165 A1 Oct. 17, 2024

(30) Foreign Application Priority Data

Sep. 24, 2021 (CN) .......................... 202111125485.3

(51) Int. Cl.
*B60N 2/10* (2006.01)
*B60N 2/02* (2006.01)
*B60N 2/26* (2006.01)

(52) U.S. Cl.
CPC ........... *B60N 2/10* (2013.01); *B60N 2/02258* (2023.08); *B60N 2/0228* (2013.01); *B60N 2/26* (2013.01)

(58) Field of Classification Search
CPC .... B60N 2/10; B60N 2/02258; B60N 2/0228; B60N 2/26; B60N 2/02253; B60N 2/2875; B60N 2/2821; B60N 2/2869
See application file for complete search history.

(56) References Cited

U.S. PATENT DOCUMENTS 7,073,859 B1 7/2006 Wilson
11,400,838 B2 * 8/2022 Liu ...................... B60N 2/2875
(Continued)

FOREIGN PATENT DOCUMENTS

CN 204870631 U 12/2015
CN 108859884 A 11/2018
(Continued)

OTHER PUBLICATIONS

"First Office Action Issued in Corresponding Australian Patent Application No. 2022353162", Mailed Date: Jan. 28, 2025, 3 pages.
(Continued)

*Primary Examiner* — Magdalena Topolski
*Assistant Examiner* — Shanna Danielle Glover
(74) *Attorney, Agent, or Firm* — Volpe Koenig

(57) ABSTRACT

The invention discloses an electric angle adjustment device comprising a motor, a rotating member, a sliding member, and an intermediate transmission assembly. The motor is disposed on one of the seat body and the base, and an output shaft of the motor extends along a left-right direction or up-down direction of the base, such that the output shaft of the motor is arranged intersecting with the rotating member. The sliding member is assembled on the other one of the seat body and the base, the sliding member is also slidably arranged on the rotating member; the intermediate transmission assembly is assembled on both the output shaft of the motor and the rotating member; wherein the motor drives the rotating member to rotate through the intermediate
(Continued)

transmission assembly, and the rotating member in rotating brings the sliding member to slide on the rotating member.

19 Claims, 9 Drawing Sheets

(56) References Cited

U.S. PATENT DOCUMENTS

| | | | |
|---|---|---|---|
| 2003/0151281 | A1 | 8/2003 | Williams |
| 2003/0160486 | A1 | 8/2003 | Dukes |
| 2016/0207497 | A1 | 7/2016 | Seal et al. |
| 2021/0268941 | A1 | 9/2021 | Zhang |

FOREIGN PATENT DOCUMENTS

| | | | | |
|---|---|---|---|---|
| CN | 110214094 | A | 9/2019 | |
| CN | 212950274 | U | 4/2021 | |
| CN | 213082970 | U | 4/2021 | |
| CN | 214240524 | U | 9/2021 | |
| DE | 102018201329 | A1 | 8/2018 | |
| DE | 212018000069 | U1 | 2/2019 | |
| EP | 0703113 | A2 | 3/1996 | |
| EP | 3576977 | A1 | 12/2019 | |
| EP | 3576977 | B1 * | 6/2021 | ............ F16H 57/00 |
| FR | 2778376 | A1 | 11/1999 | |
| JP | H04349041 | A | 12/1992 | |

OTHER PUBLICATIONS

“Notice of Reasons for Refusal Issued in Corresponding Japanese Patent Application No. 2024-515121”, Mailed Date: Apr. 1, 2025, 10 pages.

“Notice of Allowance Issued in Corresponding Taiwanese Patent Application No. 113123541”, Mailed Date: Aug. 26, 1 2024, 4 pages.

Office Action issued in corresponding Taiwanese Application No. 111136185 dated Jan. 18, 2024.

International Search Report and Written Opinion for Application No. PCT/EP2022/076675 dated Jan. 20, 2023.

First Office Action for corresponding Chinese Application No. 202111125485.3 dated Dec. 15, 2025, along with English translation, 14 pages.

* cited by examiner

CHILD SAFETY SEAT AND ELECTRIC ANGLE ADJUSTMENT DEVICE THEREOF

CROSS-REFERENCE TO RELATED APPLICATIONS

This application is a National Stage application of PCT/EP2022/076675, filed on Sep. 26, 2022, which claims the benefit of Chinese Application No. 202111125485.3, filed on Sep. 24, 2021, both of which are incorporated herein by reference in their entirety.

TECHNICAL FIELD

The present invention relates to baby products, and more specifically to a child safety seat and electric angle adjustment device thereof.

BACKGROUND

Child safety seats have been indispensable means of transportation for children to travel. In order to meet the comfort of the child's sitting, a child safety seat generally can be adjusted in angle.

At present, for the existing child safety seat, its angle adjustment mechanism for adjusting the angle has an electrically driven structure, and also has a manually driven structure. Compared with the manually driven structure, the electrically driven structure has the advantage of being more convenient to performing adjustment. However, in the electrically driven structure, since the screw rod assembled on the output shaft of the motor is connected with the output shaft in a straight line, the overall length of the electrically driven structure is long, and the occupied space is large, which increases the difficulty of arranging the electrically driven structure on the child safety seat.

SUMMARY

The invention provides an electric angle adjustment device disposed between a seat body and a base of a child safety seat, the seat body is slidably assembled on base along a front-rear direction of the base, and the seat body is angularly adjusted in respect to the base during the sliding process, moreover, the electric angle adjustment device of the invention comprises a motor, a rotating member, a sliding member, and an intermediate transmission assembly. The rotating member extends along a sliding direction of the seat body, the motor is disposed on one of the seat body and the base, and an output shaft of the motor extends along a left-right direction or an up-down direction of the base, such that the output shaft of the motor is arranged intersecting with the rotating member; the sliding member is assembled on the other one of the seat body and the base, the sliding member is also slidably arranged on the rotating member; the intermediate transmission assembly is assembled on both the output shaft of the motor and the rotating member; wherein the motor drives the rotating member to rotate through the intermediate transmission assembly, and the rotating member in rotating brings the sliding member to slide on the rotating member, thereby electrically adjusting angle of the seat body in respect to the base.

Preferably, the output shaft of the motor and the rotating member are arranged in a cross shape.

Preferably, the motor is pivotally connected to the seat body or the base, wherein in a process that the motor drives the rotating member to rotate through the intermediate transmission assembly, when the rotating member brings the sliding member to slide on the rotating member along an extension direction of the rotating member, the rotating member and the intermediate transmission assembly also follow the motor to pivot.

Preferably, the intermediate transmission assembly comprises a first synchronizing member and a second synchronizing member which are engaged with each other for transmission, the first synchronizing member is fixedly sleeved on the output shaft of the motor, and the second synchronizing member is fixedly sleeved on the rotating member.

Preferably, the first synchronizing member is one of a worm wheel and a worm, and the second synchronizing member is the other one of the worm wheel and the worm; or the first synchronizing member and the second synchronizing member are respectively bevel gears.

Preferably, the electric angle adjustment device of the invention further comprises a connection receptacle fixedly connected to the motor, and the connection receptacle is pivotally connected to the seat body or the base where the motor is located.

Preferably, the connection receptacle surrounds the first synchronizing member and the second synchronizing member from all sides.

Preferably, the electric angle adjustment device of the invention further comprises a control switch electrically connected with the motor to control a forward rotation and a reverse rotation of the motor.

Preferably, the control switch is movably assembled on the base and/or the seat body.

Preferably, the control switch controls one of the forward rotation and the reverse rotation of the motor when moving in a first direction, and the control switch controls the other one of the forward rotation and the reverse rotation of the motor when moving in a second direction opposite to the first direction.

In order to achieve the above-mentioned purpose, the child safety seat of the invention comprises a base, a seat body slidably assembled on the base along a front-rear direction of the base, and the aforementioned electric angle adjustment device. The seat body is angularly adjusted in respect to the base during the sliding process.

Preferably, a transverse rod disposed along a left-right direction of the seat body and sliding following the sliding member is assembled on the sliding member, the transverse rod protrudes out of the sliding member, the seat body or the base where the motor is located is correspondingly provided with an arc guide passage, the transverse rod is placed in the arc guide passage in a clearance fit and is capable of performing a curve sliding along the arc guide passage, and the seat body or the base where the sliding member is located is assembled and connected with the sliding member through the transverse rod.

Preferably, the transverse rod passes through arc guide passage in a direction away from the sliding member and is then fixedly connected to the seat body or the base where the sliding member is located.

Preferably, there are two arc guide passages and the two arc guide passages are arranged separated from each other, and the sliding member is located between the two arc guide passages.

Preferably, one of the seat body and the base is assembled with an auxiliary rod parallel to the transverse rod, the auxiliary rod and the transverse rod are spaced apart from one another, and the other one of the seat body and the base is correspondingly provided with an arc auxiliary channel, and arc centers of the arc auxiliary channel and the arc guide passage are located on a same axis line, the auxiliary rod is placed in the arc auxiliary channel in a clearance fit and is capable of performing a curve sliding along the arc auxiliary channel.

Preferably, there are two the arc auxiliary channels and the two arc auxiliary channels are arranged separated from each other.

Preferably, the base comprises a turntable and a base body, the turntable is assembled on the base body from above and is rotatable around a rotation line arranged in an up-down direction of the base body, the seat body is curved slidably assembled on the turntable, the motor is assembled on one of the seat body and the turntable, and the transverse rod is assembled on the other one of the seat body and the turntable.

Preferably, the turntable is provided with a first supporting side rib and a second supporting side rib which are raised upward and aligned leftward and rightward, the first supporting side rib and the second supporting side rib are each provided with the arc guide passage, and the sliding member is located between the first supporting side rib and the second supporting side rib.

Preferably, the turntable is further provided with a first auxiliary side rib and a second auxiliary side rib which are raised upward and aligned leftward and rightward, the first auxiliary side rib is located in a corresponding rear of the first supporting side rib, and the second auxiliary side rib is located in a corresponding rear of the second supporting side rib.

Preferably, the first auxiliary side rib and the second auxiliary side rib are each provided with an arc auxiliary channel, arc centers of the arc auxiliary channel and the arc guide passage are located on a same axis line, an auxiliary rod parallel to the transverse rod is assembled on the seat body, and the auxiliary rod is placed in the arc auxiliary channels in a clearance fit and is capable of performing a curve sliding along the arc auxiliary channels.

Preferably, the sliding member and the transverse rod are rotatable in respect to each other.

Compared with the prior art, since the rotating member extends along the sliding direction of the seat body, and the output shaft of the motor extends along the left-right direction or up-down direction of the base, such that the output shaft of the motor is arranged intersecting with the rotating member, such arrangement makes the of electric angle adjustment device of the invention occupy less space and is relatively short as whole. Meanwhile, since the motor is disposed on one of the seat body and the base, the sliding member is assembled on the other one of the seat body and the base, the sliding member is also slidably arranged on the rotating member, and the intermediate transmission assembly is assembled on both the output shaft of the motor and the rotating member, such design may ensure the motor to drive the rotating member to rotate through the intermediate transmission assembly when its output shaft is arranged intersecting with the rotating member, and the rotating member in rotating brings the sliding member to slide on the rotating member along the extension direction of the rotating member, thereby electrically adjusting the angle of the seat body in respect to the base.

DETAILED DESCRIPTION

Figure 1:
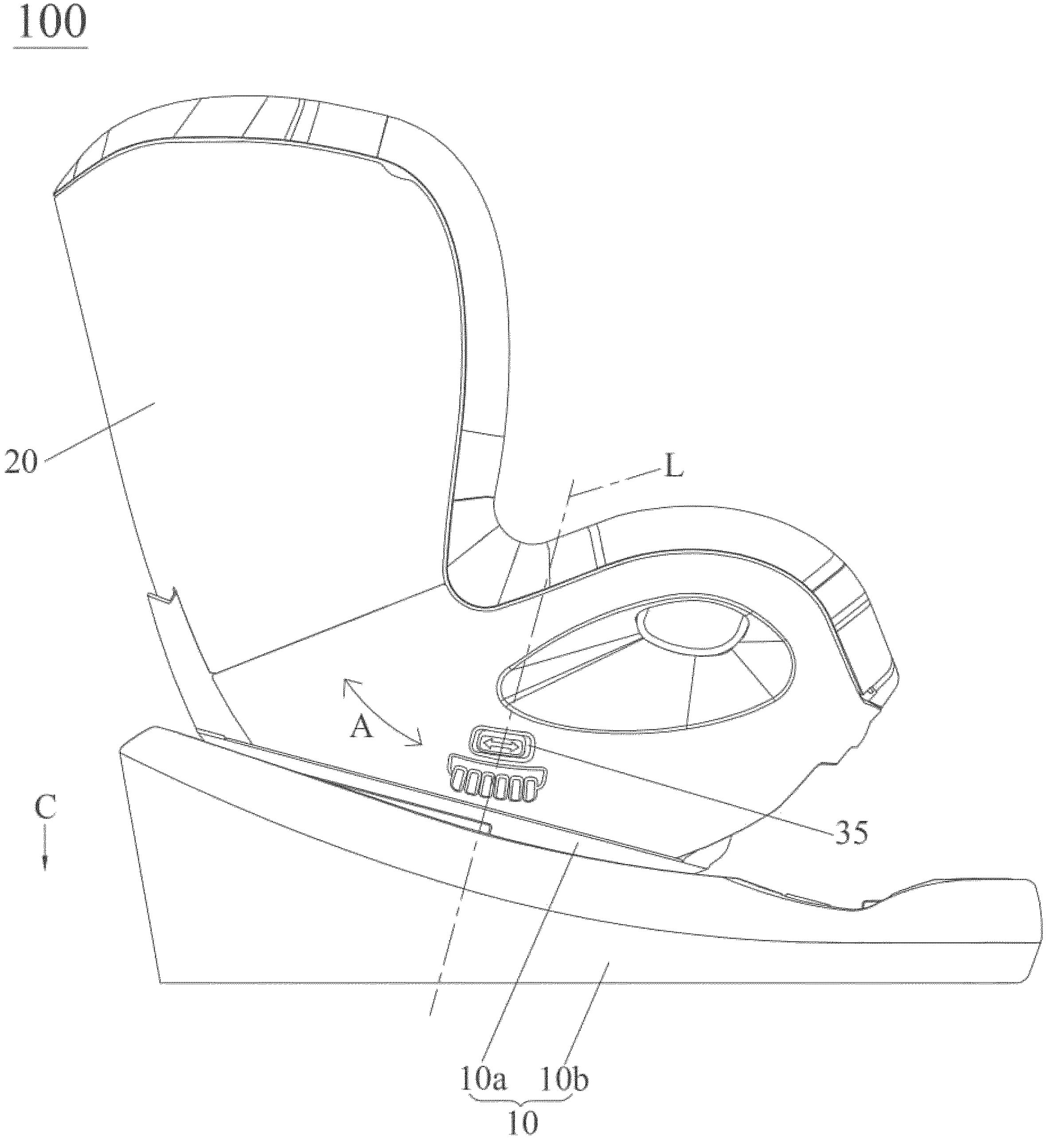
FIG. 1 is a schematic plane structure view of a child safety seat of the invention viewed from right to left.

Now embodiments of the invention will be described with reference to the accompanying drawings, in which like reference numerals represent like elements.

Figure 2:
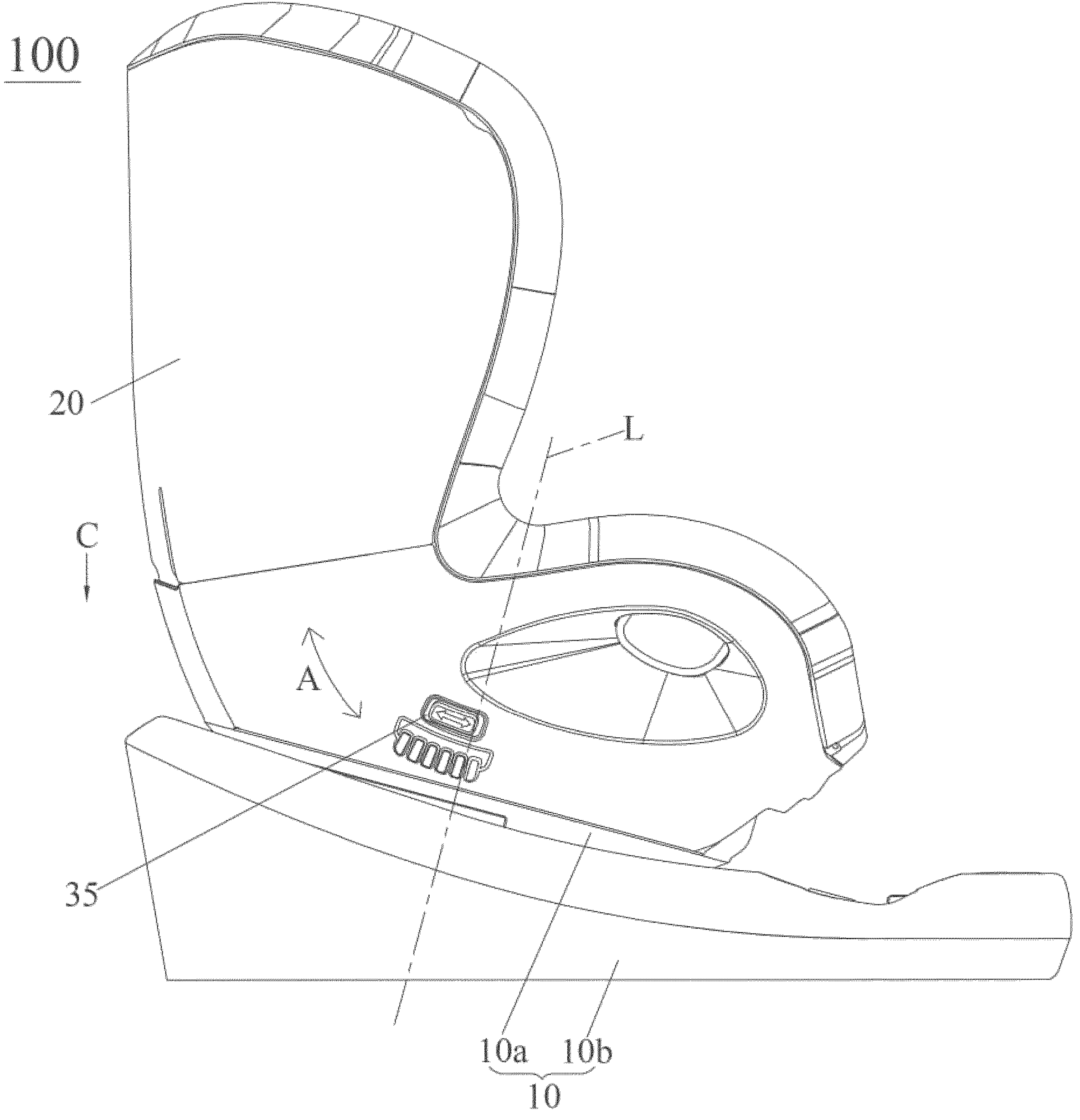
FIG. 2 is a schematic plane structure view of the child safety seat shown in FIG. 1 after a base body is adjusted toward an upright direction.
Figure 3:
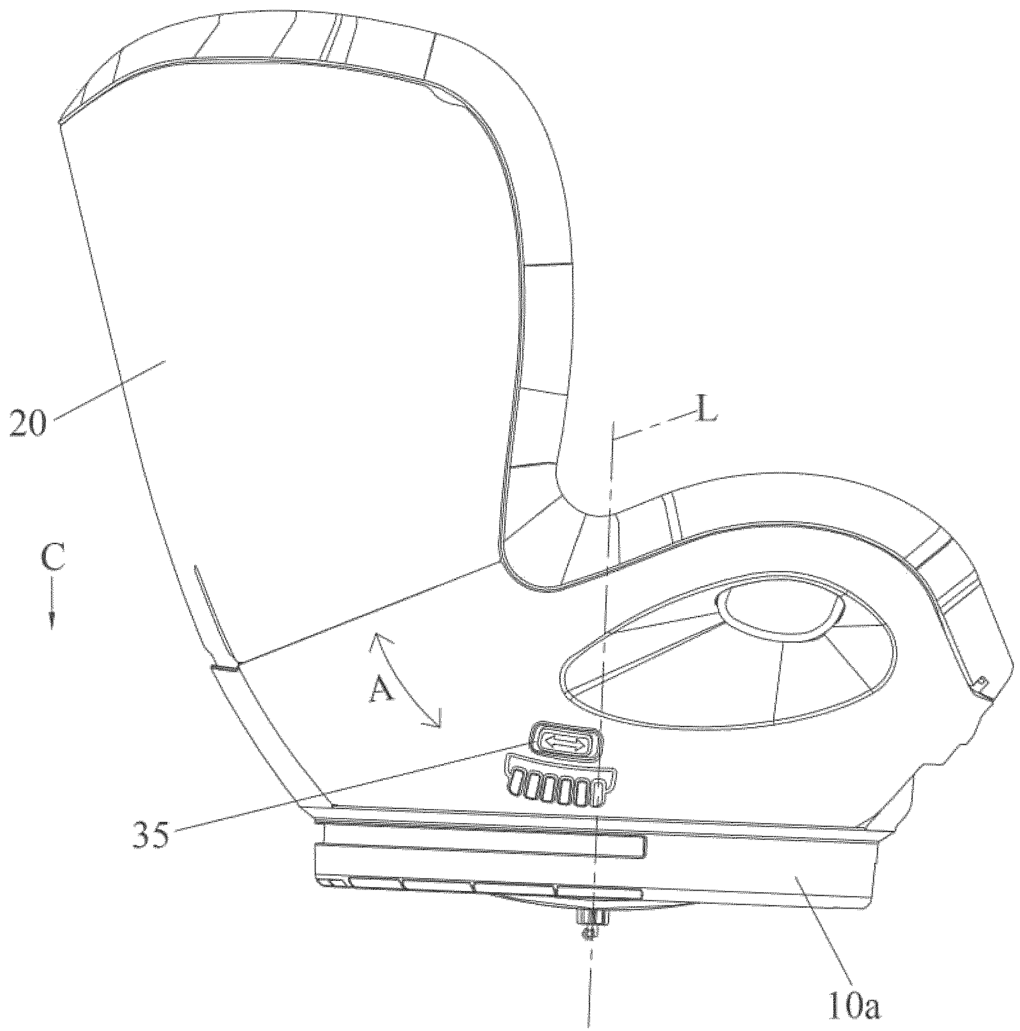
FIG. 3 is a schematic plane structure view of the child safety seat shown in FIG. 2 after the base body is hidden.

Referring to FIGS. 1 to 5, the child safety seat 100 of the invention comprises a base 10, a seat body 20, and an electric angle adjustment device 30. The seat body 20 can be slidably assembled on the base 10 along a front-rear direction of the base 10, such that the seat body 20 is angularly adjusted in respect to the base 10 during the sliding process. Preferably, the seat body 20 performs a curve sliding in respect to the base 10. For example, when the seat body 20 performs a forward curve sliding in respect to the base 10 and slides to a first limit position, the seat body 20 is adjusted in respect to the base 10 to a most flat lying position as shown in FIG. 1. When the seat body 20 performs a backward curve sliding in respect to the base 10 and slides to a second limit position, the seat body 20 is adjusted in respect to the base 10 to a most upright position as shown in FIG. 2, so as to ensure the comfort of the child in sitting. Specifically, in FIGS. 1 to 5, the base 10 comprises a turntable 10*a* and a base body 10*b*. The turntable 10*a* is assembled on the base body 10*b* from above and can rotate around a rotation line L which is arranged in an up-down direction of the seat body 20. At this time, the seat body 20 can be curved slidably assembled on the turntable 10*a*, such that the seat body 20 can be rotated and adjusted in respect to the base body 10*b* around the rotation line L by the turntable 10*a*. When the seat body 20 does not need to be rotated and adjusted around the rotation line L, the base 10 at this time is regarded as a whole and is not designed to comprise the turntable 10*a* and the base body 10*b*. More specifically as follows:

As shown in FIGS. 1 to 3, the rotation line L is arranged obliquely in respect to a vertical direction. Such a design may ensure the seat body 20 performing curve sliding can follow the turntable 10*a* to rotate around the rotation line L more smoothly, and also arranges the base body 10*b* thin in the front and thick in the rear. Of course, according to actual requirements, the rotation line L may also be designed to be vertically arranged. At this time, thickness of the base body

10*b* is required to be as consistent as possible, so the invention is not limited to the above example.

Figure 4:
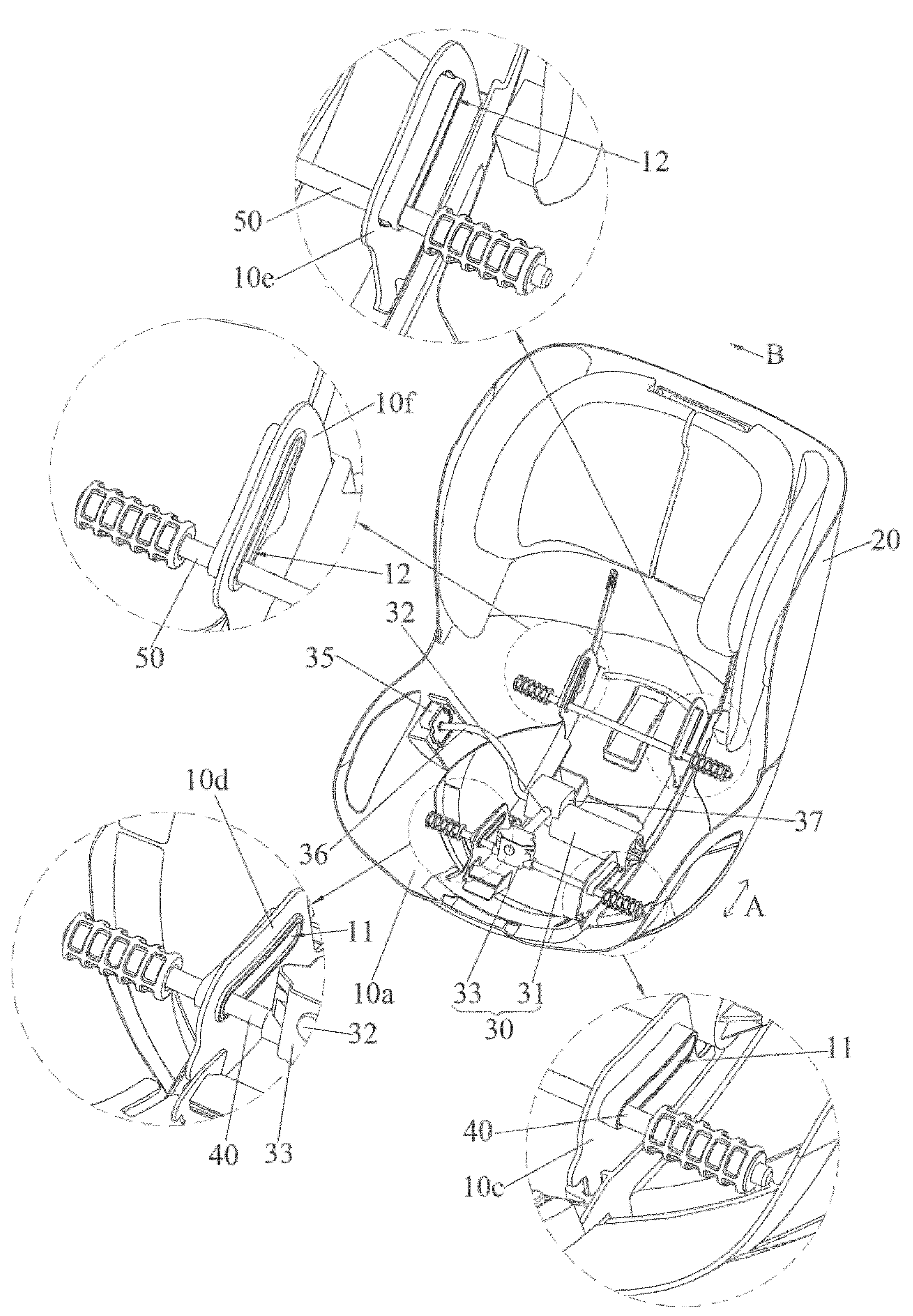
FIG. 4 is a schematic perspective structure view of 4 the child safety seat of the invention after the base body and part of the seat body is hidden and when the seat body is in a most flat lying position.
Figure 5:
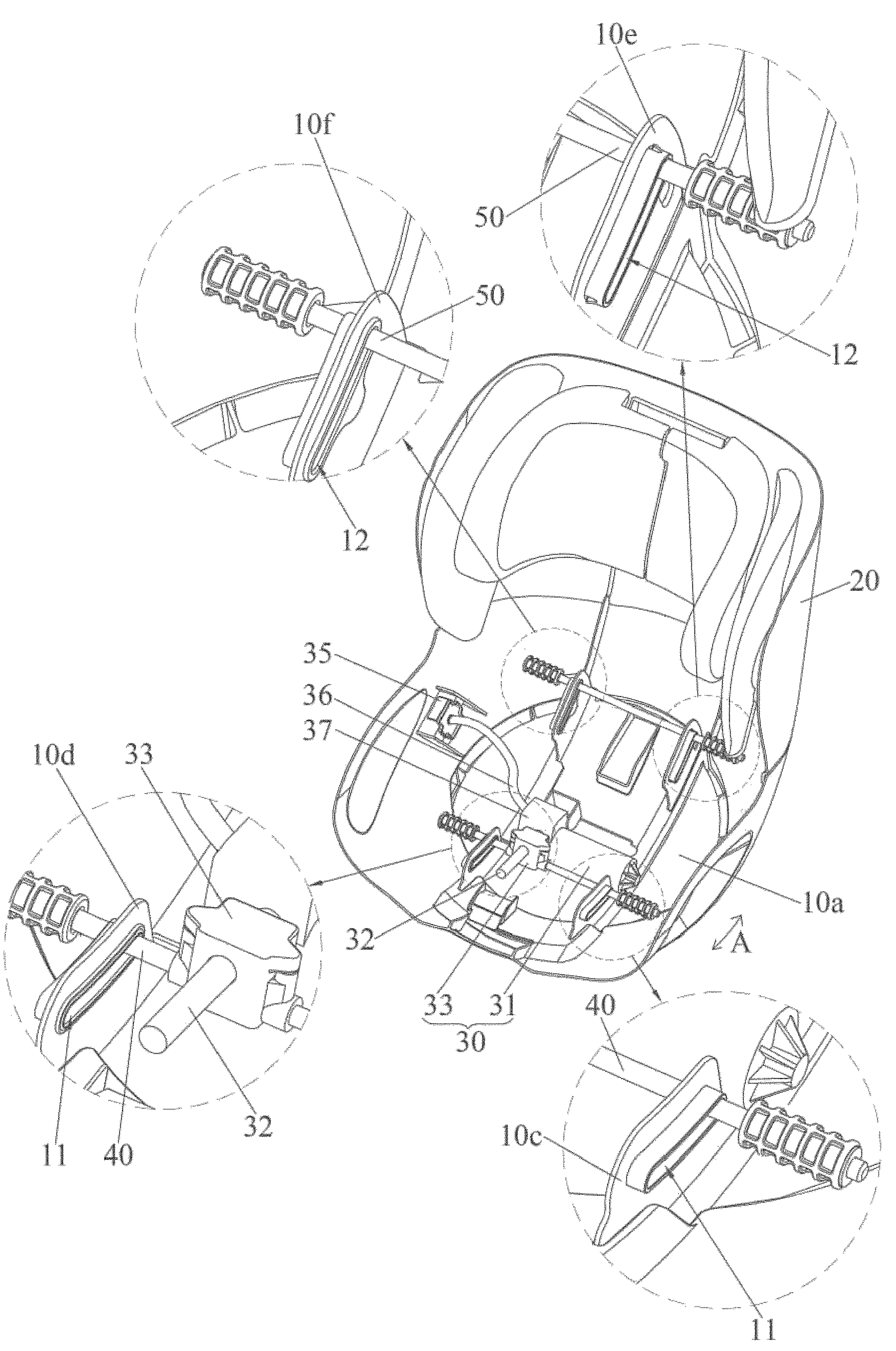
FIG. 5 is a schematic perspective structure view of the child safety seat of the invention after the base body and part of the seat body are hidden and when the seat body is in a most upright position.
Figure 6:
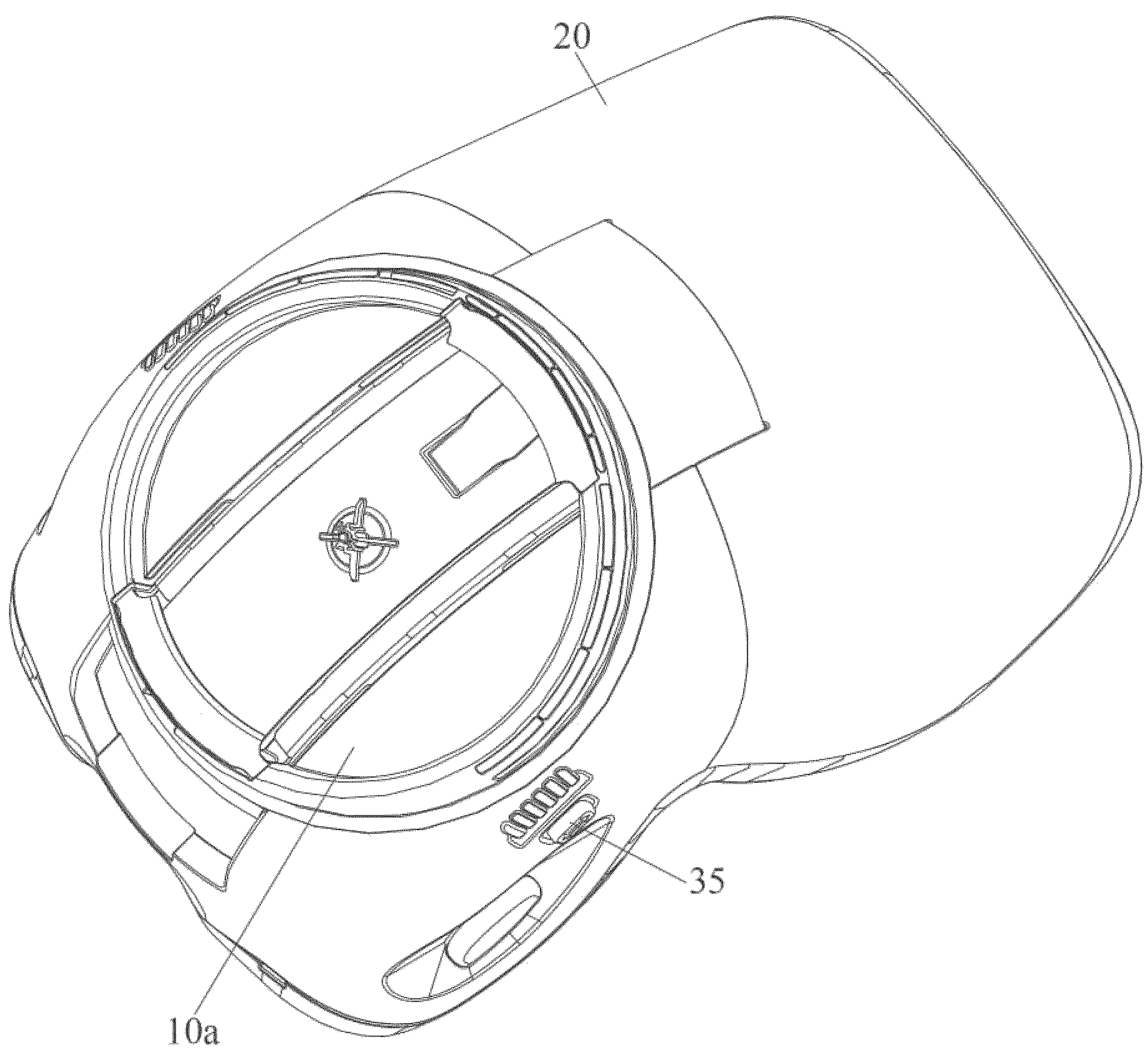
FIG. 6 is a schematic perspective structure view of the child safety seat shown in FIG. 5 at another angle.
Figure 8:
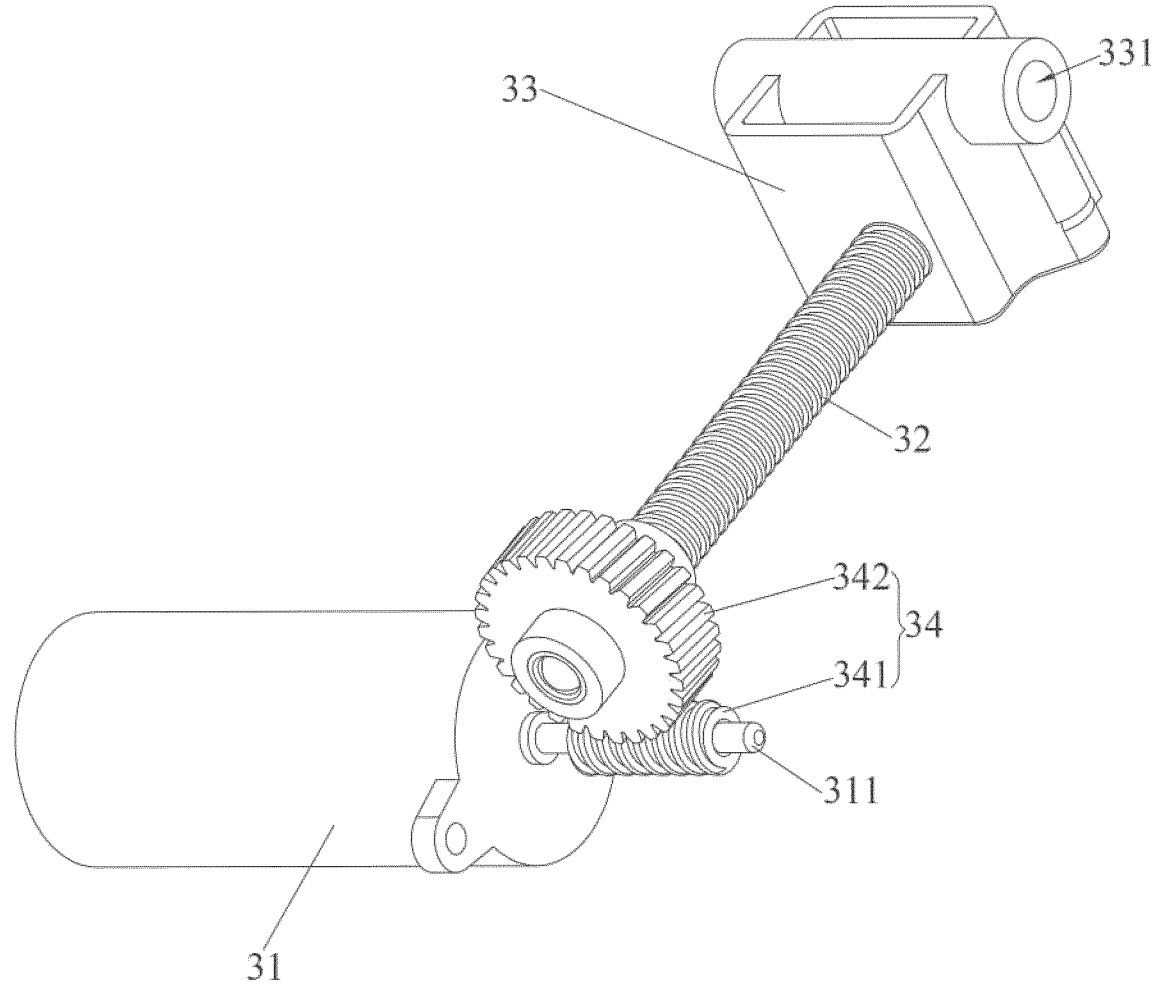
FIG. 8 is a schematic perspective structure view of the electric angle adjustment device shown in FIG. 7 after a connection receptacle is hidden.
Figure 9:
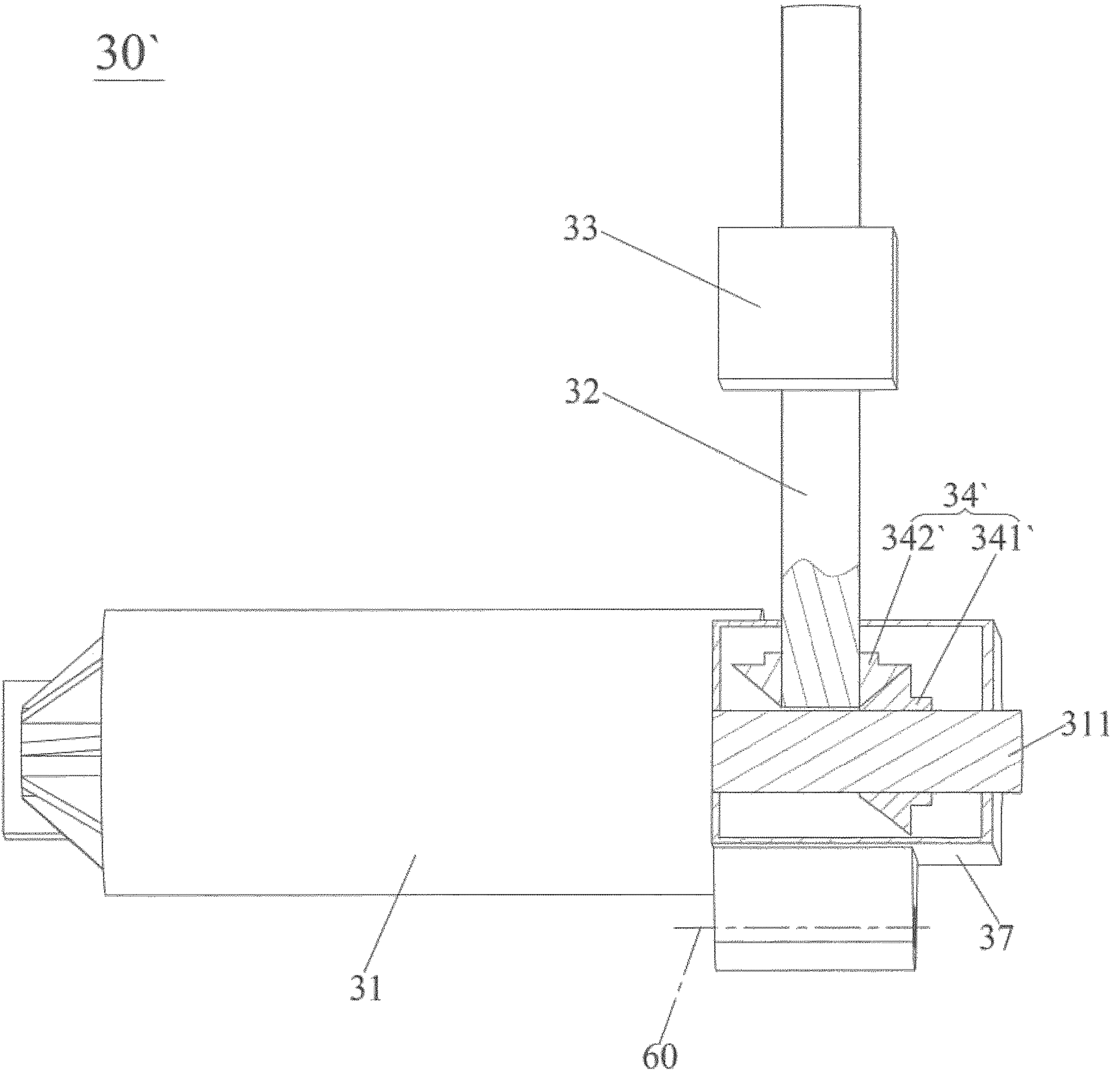
FIG. 9 is a schematic perspective structure view of the electric angle adjustment device shown in FIG. 7 after being deformed and partially cut.

As shown in FIGS. 4, 5 and 8, the electric angle adjustment device 30 comprises a motor 31, a screw 32, a nut 33, and an intermediate transmission assembly 34. The screw 32 extends along a sliding direction of the seat body 20 (see the double arrow A), such that length of the screw 32 matches the front-rear direction of the seat body 20, so the screw 32 can reasonably utilize space of the seat body 20 and reduces the space occupancy. The motor 31 is pivotally connected to the base 10, more specifically, pivotally connected to the turntable 10*a* of the base 10, such that the motor 31 can be pivoted in respect to the turntable 10*a*. An output shaft 311 of the motor 31 is arranged intersecting with the screw 32. For example, the output shaft 311 of the motor 31 may extend along a left-right direction of the base 10, such that the output shaft 311 of the motor 31 and the screw 32 are preferably arranged in a cross shape, and such state is shown in FIG. 8 or 9, but the invention is not limited in this respect. The nut 33 is assembled on the seat body 20, and the nut 33 is also slidably sleeved on the screw 32 and engages with the screw 32 for transmission. The intermediate transmission assembly 34 is assembled on both the output shaft 311 of the motor 31 and the screw 32, so in the process that the motor 31 drives the screw 32 to rotate through the intermediate transmission assembly 34, when the screw 32 brings the nut 33 to slide on the screw 32 along an extension direction of the screw 32, the screw 32 and the intermediate transmission assembly 34 follow the motor 31 to pivot as well, that is, the screw 32 and the intermediate transmission assembly 34 also follow the motor 31 to pivot in respect to the base 10, so as to electrically and smoothly adjust an angle of the seat body 20 in respect to the base 10. For example, during a process that the motor 31 drives the screw 32 through the intermediate transmission assembly 34 to bring the nut 33 to slide forward along the screw 32, the seat body 20 is brought by the nut 33 to perform a forward curve sliding in respect to the base 10 until the seat body 20 slides to the first limit position, such that the seat body 20 is in the most flat lying position shown in FIG. 1 in respect to the base 10; moreover, during a process that the motor 31 drives the screw 32 through the intermediate transmission assembly 34 to bring the nut 33 to slide backward along the screw 32, the seat body 20 is brought by the nut 33 to perform a backward curve sliding in respect to the base 10 until the seat body 20 slides to the second limit position, such that the seat body 20 is in the most upright position shown in FIG. 2 in respect to the base 10, but the invention is not limited in this respect. It can be understood, according to actual requirements, the motor 31 may also be pivotally connected to the seat body 20, and the nut 33 may be assembled on the base 10, which can also achieve the purpose of electrically and smoothly adjusting the angle of the seat body 20 in respect to of the base 10, so the invention is not limited in this respect. Furthermore, for the specific structure of the intermediate transmission assembly 34, please refer to the following description.

As shown in FIG. 8, the intermediate transmission assembly 34 comprises a first synchronizing member 341 and a second synchronizing member 342 which are engaged with each other for transmission. The first synchronizing member 341 is fixedly sleeved on the output shaft 311 of the motor 31, such that the first synchronizing member 341 follows the output shaft 311 of the motor 31 to rotate together. The second synchronizing member 342 is fixedly sleeved on the screw 32, such that the second synchronizing member 342 rotates together with the screw 32 due to being fixed with the screw 32. Specifically, in the embodiment shown in FIG. 8, the first synchronizing member 341 is a worm, and the second synchronizing member 342 is a worm wheel, such design can reduce the length of the screw 32 occupied by the worm wheel, further making the occupied space of the electric angle adjustment device 30 small and the whole shorter. Of course, according to actual requirements, the first synchronizing member 341 may be a worm wheel and the second synchronizing member 342 may be a worm, so the invention is not limited to that shown in FIG. 8.

Figure 7:
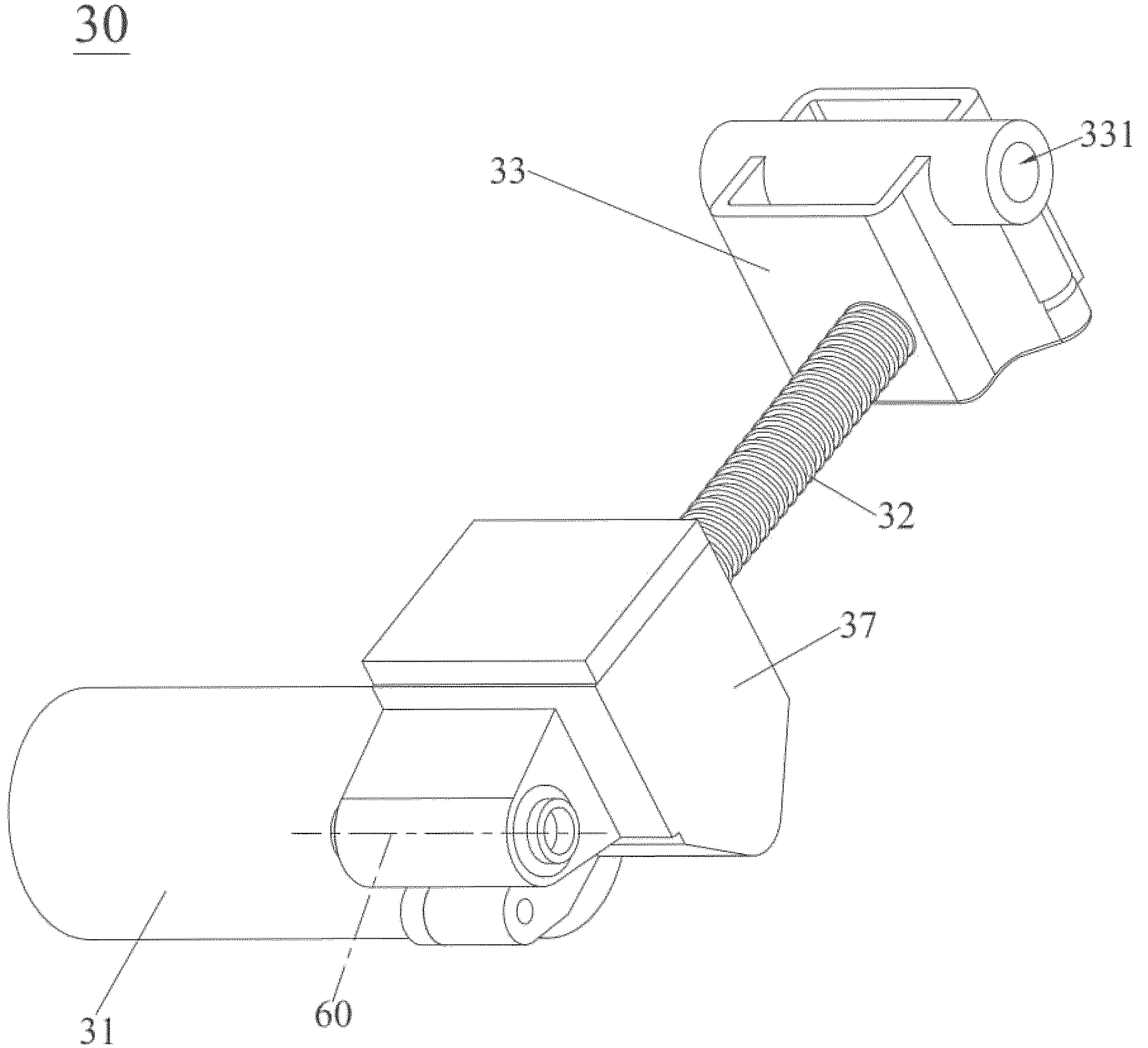
FIG. 7 is a schematic perspective structure view of an electric angle adjustment device in the child safety seat of the invention.

As shown in FIGS. 4, 5 and 7, in order to facilitate pivotally connecting of the motor 31 and the base 10, the electric angle adjustment device 30 further comprises a connection receptacle 37 fixedly connected with the motor 31. The connection receptacle 37 is pivotally connected to the base 10, such that the motor 31 is indirectly pivotally connected to the base 10 through the connection receptacle 37. Of course, according to actual requirements, the motor 31 may also be directly pivotally connected to the base 10, so the invention is not limited in this respect. Specifically, in FIG. 7, the connection receptacle 37 surrounds the first synchronizing member 341 and the second synchronizing member 342 from all sides, so as store up the first synchronizing member 341 and the second synchronizing member 342, avoiding external objects to affect working of the first synchronizing member 341 and the second synchronizing member 342. More specifically, in FIG. 7, the connection receptacle 37 has a boxed structure, and a pivotally connecting line 60 between the connection receptacle 37 and the base 10 is located in front of the intermediate transmission assembly 34, such that the screw 32 and the intermediate transmission assembly 34 follow the motor 31 to pivot more flexibly and smoothly in respect to of the base 10, thereby ensuring more effectively the seat body 20 is brought by the nut 33 to perform a smoother curve sliding in respect to the base 10, but the invention is not limited in this respect.

As shown in FIGS. 1 to 6, the electric angle adjustment device 30 further comprises a control switch 35 that is electrically connected to the motor 31 to control a forward rotation and a reverse rotation of the motor 31. Preferably, the control switch 35 is movably assembled on the seat body 20. Preferably, the control switch 35 is located at a left side wall of the seat body 20 or at a right side wall of the seat body 20. Of course, according to actual requirements, the control switch 35 may also be installed on the base 10, or alternatively, may be suspended outside the child safety seat 100 of the invention by a cable, so the invention is not limited in this respect. Specifically, in FIGS. 4 and 5, the control switch 35 is electrically connected to the motor 31 by a wire 36, but the invention is not limited in this respect. Meanwhile, in FIGS. 1 to 3, the control switch 35 controls a forward rotation of the motor 31 when moving in a first direction, and the control switch 35 controls a reverse rotation of the motor 31 in a second direction opposite to the first direction. For example, the first direction refers to movement of the control switch 35 along the front of the seat body 20, and the second direction refers to movement of the control switch 35 along the rear of the seat body 20, so as to control forward rotation and reverse rotation of the motor 31 by one control switch 35. It can be understood, if one control switch 35 can only control a forward rotation or a reverse rotation of the motor 31, then two control switches 35 are needed at this moment. Moreover, if there are two control switches 35, then one control switch 35 may be installed on the seat body 20 and the other switch 35 may be installed on the base 10, or alternatively, the two control switches 35 may be installed on the seat body 20 or the base

10 at the same time. It should be noted, if one control switch 35 is used to control forward and reverse rotations of the motor 31, two circuits are needed between the control switch 35 and the motor 31, i.e., one circuit for controlling forward rotation of the motor 31 and the other circuit for controlling reverse rotation of the motor 31, such that when the control switch 35 moves in the first direction or in the second direction, one circuit is closed and the other circuit is opened. Since structure of the circuit is well known in the art, the circuit will not be described in detail here.

As shown in FIGS. 4 and 5, a transverse rod 40 being arranged along the left-right direction of the seat body 20 and sliding following the nut 33 is assembled on the nut 33. The transverse rod 40 protrudes out of the nut 33. The turntable 10*a* of the base 10 where the motor 31 is located is correspondingly provided with an arc guide passage 11, and the transverse rod 40 is placed in the arc guide passage 11 in a clearance fit and can perform a curve sliding along the arc guide passage 11. The turntable 10*a* of the base 10 where the nut 33 is located is assembled and connected with the nut 33 through the transverse rod 40. Therefore, by cooperation of the transverse rod 40 and the arc guide passage 11, a guide is provided for the curve sliding of the seat body 20 in respect to of the base 10, such that the curve sliding of the seat body 20 in respect to of the base 10 is performed smoother; in addition, the curve sliding of the seat body 20 in respect to of the base 10 needs to be limited, so as to prevent the seat body 20 from excessively sliding in respect to the base 10; for example, in FIG. 4, when the nut 33 brings the transverse rod 40 forward together with the seat body 20 to slide to a position where the transverse rod 40 and a front end of the arc guide passage 11 abut against each other (referred to as the first limit position), the seat body 20 at this time can no longer be adjusted forward and is in the most flat lying position shown in FIG. 1; moreover, in FIG. 5, when the nut 33 brings the transverse rod 40 backward together with the seat body 20 to slide to a position where the transverse rod 40 and a rear end of the arc guide passage 11 abut against each other (referred to as the second limit position), the seat body 20 at this time can no longer be adjusted backward and is in the most upright position shown in FIG. 2. Specifically, in FIGS. 4 and 5, the transverse rod 40 passes through the arc guide passage 11 in a direction away from the nut 33 and is then fixedly connected to the seat body 20 where the nut 33 is located, so as to ensure reliability of the fixing between the seat body 20 and the transverse rod 40. More specifically, in FIGS. 4 and 5, there are two arc guide passages 11 and the two arc guide passages 11 are arranged separated from each other. Preferably, the two arc guide passages 11 are arranged separated from each other with one on the left and the other one on the right, and the nut 33 is located between the two arc guide passages 11, so as to ensure compactness and rationality of the arrangement of the screw 32, the nut 33, and the transverse rod 40. In addition, in FIGS. 7 and 8, the nut 33 is provided with an insertion hole 331 for inserting the transverse rod 40, such that the transverse rod 40 also rotates in respect to the nut 33 to further improve smoothness of the nut 33 to bring the seat body 20 to perform curve sliding in respect to the base 10.

As shown in FIGS. 4 and 5, the turntable 10*a* is provided with a first supporting side rib 10*c* and a second supporting side rib 10*d* which are raised upward and aligned leftward and rightward. The first supporting side rib 10*c* and the second supporting side rib 10*d* are each provided with an arc guide passage 11, and the nut 33 is located between the first supporting side rib 10*c* and the second supporting side rib 10*d*. Such design makes the arrangement of the screw 32, the nut 33, the motor 31, the intermediate transmission assembly 34, and the transverse rod 40 on the turntable 10*a* more compact and more reasonable. Specifically, in FIGS. 4 and 5, the turntable 10*a* is also provided with a first auxiliary side rib 10*e* and second auxiliary side rib 10*f* which are raised upward and aligned leftward and rightward. The first auxiliary side rib 10*e* is located in a corresponding rear of the first supporting side rib 10*c*, and the second auxiliary side rib 10*f* is located in a corresponding rear of the second supporting side rib 10*d*. The first auxiliary side rib 10*e* and the second auxiliary side rib 10*f* are each provided with an arc auxiliary channel 12. Arc centers of the arc auxiliary channel 12 and the arc guide passage 11 are located on a same axis line. An auxiliary rod 50 parallel to the transverse rod 40 is assembled on the seat body 20, and the auxiliary rod 50 is placed in the arc auxiliary channels 12 in a clearance fit and can perform a curve sliding along the arc auxiliary channels 12. Therefore, by virtue of the arc centers of the arc auxiliary channels 12 and the arc guide passages 11 being located on the same axis line, the seat body 20 can perform curve sliding around the same axis line, effectively ensuring smoothness of the seat body 20 for perform a curve sliding of in respect to the base 10, and by virtue of cooperation between the auxiliary rod 50 and the arc auxiliary channels 12, increasing reliability and smoothness of the seat body 20 for perform a curve sliding in respect to the base 10. In addition, by virtue of arranging the first supporting side rib 10*c*, the second supporting side rib 10*d*, the first auxiliary side rib 10*e*, and the second auxiliary side rib 10*f*, such that the motor 31, the intermediate transmission assembly 34, the screw 32, and the nut 33 are surrounded by the first supporting side rib 10*c*, the second supporting side rib 10*d*, the first auxiliary side rib 10*e*, and the second auxiliary side rib 10*f* from all sides, so the arrangement is more reasonable and occupies less space.

FIG. 9 shows a varied structure of the electric angle adjustment device. In FIG. 9, the electric angle adjustment device 30' and the electric angle adjustment device 30 shown in FIG. 8 lies in the intermediate transmission assembly. Specifically, in the electric angle adjustment device 30', the first synchronizing member 341' and the second synchronizing member 342' of the intermediate transmission assembly 34' are respectively bevel gears; and in the electric angle adjustment device 30, the first synchronizing member 341 and the second synchronizing member 342 of the intermediate transmission assembly 34 are respectively a worm and a worm wheel.

Except for the above-mentioned difference, the others are the same as the electric angle adjustment device 30, so they will not be redundantly repeated here.

An adjustment process of the child safety seat according to the invention will be described in conjunction with the accompanying drawings hereinafter: when the child safety seat 100 in the state shown in FIG. 2 is to be adjusted to the state shown in FIG. 1, at this moment, the operator pushes the control switch 35 to slide forward, and the motor 31 is controlled to rotate forwardly, so the screw 32 is driven by the forward rotating motor 31 through the intermediate transmission assembly 34 to bring the nut 33 to slide forward along the screw 32, and in the process of the nut 33 sliding forward along the screw 32, the screw 32 and the intermediate transmission assembly 34 also follow the motor 31 to adaptively pivot around the pivotally connecting line 60 in respect to the base 10, thereby realizing the purpose that the nut 33 brings the seat body 20 together with the auxiliary rod 50 to perform a forward curve sliding in respect to the base 10 by the transverse rod 40 until the transverse rod 40 abuts against a front end of the arc guide passage 11 and the auxiliary rod 50 abuts against a front end of the arc auxiliary channels 12 (see the state shown in FIG. 4), thus making the seat body 20 in the most flat lying position shown in FIG. 1. When the seat body 20 in the most flat lying position shown in FIG. 1 is to be adjusted to the most upright position shown in FIG. 2, at this moment, the operator pushes the control switch 35 to slide backward, and the motor 31 is controlled to rotate to rotate reversely, so the screw 32 is driven by the reversely rotating motor 31 through the intermediate transmission assembly 34 to bring the nut 33 to slide backward along the screw 32, and in the process of the nut 33 sliding backward along the screw 32, the screw 32 and the intermediate transmission assembly 34 also follow the motor 31 to adaptively pivot around the pivotally connecting line 60 in respect to the base 10, thereby realizing the purpose that the nut 33 brings the seat body 20 together with the auxiliary rod 50 to perform a backward curve sliding in respect to the base 10 by the transverse rod 40 until the transverse rod 40 abuts against a rear end of the arc guide passage 11 and the auxiliary rod 50 abuts against a rear end of the arc auxiliary channels 12 (see the state shown in FIG. 5), thus making the seat body 20 in the most upright position shown in FIG. 2.

Compared with the prior art, since the screw 32 extends along the sliding direction of the seat body 20 (i.e., the front-rear direction of the base 10), and the output shaft 311 of the motor 31 extends along the left-right direction or up-down direction of the base 10, such that the output shaft 311 of the motor 31 is arranged intersecting with the screw 32, such arrangement makes the electric angle adjustment device 30 (30') of the invention occupy only a small space and be relatively short as a whole. Meanwhile, since the motor 31 is arranged on one of the seat body 20 and the base 10, and the nut 33 is assembled on the other one of the seat body 20 and the base 10, the nut 33 may also be slidably sleeved on the screw 32 and engages with the screw 32 for transmission; the intermediate transmission assembly 34 (34') is assembled on both the output shaft 311 of the motor 31 and the screw 32, such design is to ensure that the motor 31 can drive the screw 32 to rotate through the intermediate transmission assembly 34 (34') when its output shaft 311 is arranged intersecting with the screw 32, and the nut 33 is brought by the rotating screw 32 to slide along the screw 32, thereby electrically adjusting the angle of the seat body 20 in respect to of the base 10.

It should be noted, in the accompanying drawings, the direction indicated by double arrow the direction indicated by double arrow A is the direction in which the seat body 20 performs a curve sliding in respect to of the base 10 along the front-rear direction of the base 10, the direction indicated by the arrow B is the direction of the base 10 from left to right, and the direction indicated by the arrow C is the direction of the base 10 from top to bottom.

It can be understood, when the base 10 is regarded as a whole and is not designed to comprise the turntable 10*a* and the base body 10*b*, the arc guide passage 11 is provided by the base 10; when two arc guide passages 11 are provided by the base 10, preferably the two arc guide passages 11 are arranged as one on the left and the other one on the right and are separated from each other, correspondingly, the nut 33 is located between the two arc guide passages 11; when the seat body 20 is assembled with an auxiliary rod 50 which is parallel to the transverse rod 40 and spaced apart from the transverse rod 40, the base 10 at this moment s correspondingly provided with arc auxiliary channels 12; and when there are two arc auxiliary channels 12, preferably the two arc auxiliary channels 12 are arranged as one on the left and the other one on the right and are separated from each other; arc centers of the arc auxiliary channels 12 and the arc guide passage 11 are located on the same axis line, and the auxiliary rod 50 is placed in the arc auxiliary channels 12 in a clearance fit and can performs a curve sliding along the arc auxiliary channels 12.

It should be noted, the above is described with the screw 32 as a rotating member and the nut 33 as a sliding member, but the rotating member and the sliding member are not limited to the above. In addition, although the above-mentioned the motor 31 is described as being pivotally connected, the motor 31 may also be arranged in other ways (e.g., be fixed) according to actual requirements; furthermore, the output shaft 311 of the motor 31 may also extend along a up-down direction of the base 10; so the invention is not limited in this respect.

What disclosed above is only the preferred embodiments of the invention, certainly cannot limit the scope of the invention. Therefore, all equivalent variations according to the scope of the application still belong to the scope covered by the invention.

What is claimed is:

1. A child safety seat, comprising:

a base;

a seat body slidably assembled on the base along a front-rear direction of the base, the seat body is angularly adjusted with respect to the base during a sliding process;

an electric angle adjustment device disposed between a seat body and the base, the electric angle adjustment device comprising:

a motor, a rotating member, a sliding member, and an intermediate transmission assembly, wherein:

the rotating member extends along a sliding direction of the seat body, the motor is disposed on one of the seat body and the base, and an output shaft of the motor extends along a left-right direction or an up-down direction of the base, such that the output shaft of the motor is arranged intersecting with the rotating member, the sliding member is assembled on the other one of the seat body and the base, the sliding member is also slidably arranged on the rotating member, the intermediate transmission assembly is assembled on both the output shaft of the motor and the rotating member;

the motor is configured to drive the rotating member to rotate through the intermediate transmission assembly, and the sliding member is configured to slide on the rotating member upon rotation of the rotating member, thereby electrically adjusting an angle of the seat body with respect to the base; and a transverse rod arranged on and protruding from the sliding member along a left-right direction of the seat body, the transverse rod configured to slide with the sliding member, wherein the seat body or the base where the motor is located is correspondingly provided with an arc guide passage, the transverse rod is placed in the arc guide passage in a clearance fit and is configured to perform a curve sliding along the arc guide passage, and the seat body or the base where the sliding member is located is connected to the transverse rod.

2. The child safety seat according to claim 1, wherein the output shaft of the motor and the rotating member are arranged in a cross shape.

3. The child safety seat according to claim 1, wherein the motor is pivotally connected to the seat body or the base, wherein in a process that the motor drives the rotating member to rotate through the intermediate transmission assembly, when the rotating member brings the sliding member to slide on the rotating member along an extension direction of the rotating member, the rotating member and the intermediate transmission assembly also follow the motor to pivot.

4. The child safety seat according to claim 1, wherein the intermediate transmission assembly comprises a first synchronizing member and a second synchronizing member which are engaged with each other for transmission, wherein the first synchronizing member is fixedly sleeved on the output shaft of the motor, and the second synchronizing member is fixedly sleeved on the rotating member.

5. The child safety seat according to claim 4, wherein the first synchronizing member is one of a worm wheel and a worm, and the second synchronizing member is the other one of the worm wheel and the worm; or the first synchronizing member and the second synchronizing member are respectively bevel gears.

6. The child safety seat according to claim 4, it further comprising a connection receptacle fixedly connected to the motor, and the connection receptacle is pivotally connected to the seat body or the base where the motor is located.

7. The child safety seat according to claim 6, wherein the connection receptacle surrounds the first synchronizing member and the second synchronizing member from all sides.

8. The child safety seat according to claim 1, it further comprising a control switch electrically connected with the motor to control a forward rotation and a reverse rotation of the motor, wherein the control switch is movably assembled on at least one of the base and the seat body.

9. The child safety seat according to claim 8, wherein the control switch controls one of the forward rotation and the reverse rotation of the motor when moving in a first direction, and the control switch controls the other one of the forward rotation and the reverse rotation of the motor when moving in a second direction opposite to the first direction.

10. The child safety seat according to claim 1, wherein the transverse rod is positionable within the arc guide passage in a direction away from the sliding member and fixedly connected to the seat body or the base where the sliding member is located.

11. The child safety seat according to claim 1, wherein there are two said arc guide passages and the two said arc guide passages are arranged separated from each other, and the sliding member is located between the two said arc guide passages.

12. The child safety seat according to claim 1, wherein one of the seat body and the base is assembled with an auxiliary rod parallel to the transverse rod, wherein the auxiliary rod and the transverse rod are spaced apart from one another, and the other one of the seat body and the base is correspondingly provided with an arc auxiliary channel, and arc centers of the arc auxiliary channel and the arc guide passage are located on a same axis line, the auxiliary rod is placed in the arc auxiliary channel in a clearance fit and is capable of performing a curve sliding along the arc auxiliary channel.

13. The child safety seat according to claim 12, wherein there are two said arc auxiliary channels and the two said arc auxiliary channels are arranged separated from each other.

14. The child safety seat according to claim 1, wherein the base comprises a turntable and a base body, wherein the turntable is assembled on the base body from above and is rotatable around a rotation line arranged in an up-down direction of the base body, the seat body is curved slidably assembled on the turntable, the motor is assembled on one of the seat body and the turntable, and the transverse rod is assembled on the other one of the seat body and the turntable.

15. The child safety seat according to claim 14, wherein the turntable is provided with a first supporting side rib and a second supporting side rib which are raised upward and aligned leftward and rightward, wherein the first supporting side rib and the second supporting side rib are each provided with the arc guide passage, and the sliding member is located between the first supporting side rib and the second supporting side rib.

16. The child safety seat according to claim 15, wherein the turntable is further provided with a first auxiliary side rib and a second auxiliary side rib which are raised upward and aligned leftward and rightward, wherein the first auxiliary side rib is located in a corresponding rear of the first supporting side rib, and the second auxiliary side rib is located in a corresponding rear of the second supporting side rib.

17. The child safety seat according to claim 16, wherein the first auxiliary side rib and the second auxiliary side rib are each provided with an arc auxiliary channel, wherein arc centers of the arc auxiliary channel and the arc guide passage are located on a same axis line, an auxiliary rod parallel to the transverse rod is assembled on the seat body, and the auxiliary rod is placed in the arc auxiliary channels in a clearance fit and is capable of performing a curve sliding along the arc auxiliary channels.

18. The child safety seat according to claim 1, wherein the sliding member and the transverse rod are rotatable in respect to each other.

19. A child safety seat, comprising:

a base;

a seat body, curved slidably assembled on the base along a front-rear direction of the base, and the seat body being angularly adjusted with respect to the base during a curved sliding process; and an electric angle adjustment device disposed between the seat body and the base of the child safety seat, wherein the electric angle adjustment device comprises:

a rotating member extending along a sliding direction of the seat body;

a motor, pivotally assembled on one of the seat body and the base so that the motor can pivot relative to the one of the seat body and the base, and the motor is capable of driving the rotating member to rotate;

a sliding member slidably arranged on the rotating member, wherein a transverse rod disposed along a left-right direction of the seat body is assembled on the sliding member, and the sliding member is assembled on the other one of the seat body and the base through the transverse rod;

wherein, when the motor drives the rotating member to rotate, the rotating member in rotation drives the sliding member to slide on the rotating member, thereby electrically adjusting an angle of the seat body with respect to the base; during the process that the motor drives the rotating member to rotate, the seat body performs curved sliding relative to the base, and the rotating member follows the motor to pivot relative to the one of the seat body and the base on which the motor is assembled.

* * * * *